(12) United States Patent
del Omo

(10) Patent No.: US 9,816,437 B2
(45) Date of Patent: Nov. 14, 2017

(54) COMBINED CYCLE CAES TECHNOLOGY (CCC)

(71) Applicant: Prextor Systems, S.L., Seville (ES)

(72) Inventor: Fernando Ruiz del Omo, Alcalá de Guadaíra (ES)

(73) Assignee: Prextor Systems, S.L., Seville (ES)

( * ) Notice: Subject to any disclaimer, the term of this patent is extended or adjusted under 35 U.S.C. 154(b) by 214 days.

(21) Appl. No.: 14/377,427

(22) PCT Filed: Feb. 22, 2013

(86) PCT No.: PCT/ES2013/000061
§ 371 (c)(1),
(2) Date: Aug. 7, 2014

(87) PCT Pub. No.: WO2013/124504
PCT Pub. Date: Aug. 29, 2013

(65) Prior Publication Data
US 2015/0000248 A1    Jan. 1, 2015

(30) Foreign Application Priority Data

Feb. 23, 2012 (ES) .................................. 201200228

(51) Int. Cl.
*F02C 6/16* (2006.01)
*F01K 23/10* (2006.01)
(Continued)

(52) U.S. Cl.
CPC .................. *F02C 6/16* (2013.01); *F01K 3/00* (2013.01); *F01K 7/00* (2013.01); *F01K 23/10* (2013.01); *Y02E 60/15* (2013.01)

(58) Field of Classification Search
CPC ..... F02C 6/16; F01K 3/00; F01K 7/00; F01K 23/10; Y02E 20/16
(Continued)

(56) References Cited

U.S. PATENT DOCUMENTS 3,538,340 A * 11/1970 Lang ....................... E21B 43/28
166/305.1
3,677,008 A * 7/1972 Koutz ....................... F02C 6/16
290/52
(Continued)

FOREIGN PATENT DOCUMENTS

GB          1213112 A    11/1970
WO     2005122389 A1    12/2005
(Continued)

*Primary Examiner* — Steven Sutherland
(74) *Attorney, Agent, or Firm* — IP Strategies

(57) ABSTRACT

This is a system that stores energy by compressing atmospheric air and confining it in tanks or caverns, combining the thermodynamic cycle followed by the atmospheric air (Brayton cycle) with another thermodynamic cycle followed by an auxiliary fluid, that is confined in the same cavern within a membrane, following two sections of a Rankine cycle, one during the air compression and entry into the cavern process and the other during the air outlet and turbining process, using heat from the exhaust gases from the turbine as a heat source for an additional Rankine cycle, and being able to use the tanks or caverns for making an extra constant volume heating of compressed air and/or of the auxiliary fluid.

14 Claims, 2 Drawing Sheets

(51) Int. Cl.
  *F01K 3/00*   (2006.01)
  *F01K 7/00*   (2006.01)

(58) Field of Classification Search
  USPC .............................. 60/39.15, 39.181, 39.182
  See application file for complete search history.

(56) References Cited

U.S. PATENT DOCUMENTS

| | | | |
|---|---|---|---|
| 3,831,373 A | 8/1974 | Flynt | |
| 4,150,547 A * | 4/1979 | Hobson | F02C 6/16 |
| | | | 165/45 |
| 4,237,692 A * | 12/1980 | Ahrens | F02C 3/32 |
| | | | 60/652 |
| 7,954,330 B2 * | 6/2011 | Althaus | F01K 23/10 |
| | | | 60/39.5 |
| 2007/0255459 A1 | 11/2007 | Althaus | |
| 2011/0113781 A1 * | 5/2011 | Frey | F01K 3/02 |
| | | | 60/659 |

FOREIGN PATENT DOCUMENTS

| WO | 2009146101 A2 | 12/2009 |
|---|---|---|
| WO | 2011059557 A2 | 5/2011 |

\* cited by examiner

COMBINED CYCLE CAES TECHNOLOGY (CCC)

FIELD OF THE INVENTION

The present invention relates to a system that has been specially conceived to store energy by compressing atmospheric air and confining it in tanks or caverns, so that a significant improvement of the overall efficiencies can be obtained versus current technology, as well as an important reduction of the volume requirements of the tanks or caverns.

BACKGROUND OF THE INVENTION

CAES energy storage technology is based on the storage of compressed atmospheric air. When there is a surplus of energy in the electric power grid, the compressor is activated, compressing atmospheric air to a predetermined pressure, consuming the excess power from the mains. The resulting compressed air is stored in a natural cave, abandoned mine or salt dome cavern (a tank cannot be used due to the huge dimensions it should have and the high pressures it would have to withstand, if large amounts of energy want to be stored).

In order to keep the energy stored until energy demand rises again in the power grid, it is enough to maintain the cave closed by a shut-off valve. When the power grid finally requires more energy, the valve opens and pressurized air is vented out and used to drive a turbine and generate electricity.

Building plants with this technology can be much more economically feasible than building pumped storage hydro plants, the most widespread large scale energy storage system that exists today. But the main disadvantage of CAES technology is the low efficiencies that can be achieved, resulting in a very low feasibility of the operation of the plants. In fact, although it is a technology developed over thirty years ago, there are only two CAES plants operating in the world today.

In addition, the enormous demand on cavern volume requirements and pressures to withstand reduces dramatically the range of possible locations for this type of plants, being restricted, as explained, to places where there are natural caves, abandoned mines or salt domes.

It is difficult to find available natural caverns or abandoned mines, so that both CAES plants operating today were built using salt domes. This involves a number of additional problems such as the inability to thermally insulate the caverns (the excavation is performed by dissolving salts through a borehole about 600 m deep), or high levels of suspended particles in the air when it comes out of the cavern.

BRIEF SUMMARY OF THE INVENTION

The solution to these problems is to combine the thermodynamic cycle followed by the atmospheric air (Brayton cycle) with another thermodynamic cycle followed by an auxiliary fluid, that is confined in the same cavern within a membrane, in which thermodynamic cycle the auxiliary fluid suffer volume variations, so allowing the entry and exit of compressed atmospheric air into and out of the cavern.

There are many feasible cycles that could be followed by the auxiliary fluid and that involve a substantial change in its volume. For example, it could follow two sections of a Rankine cycle, one during the air compression and entry into the cavern process and the other during the air outlet and turbininig process, such that:

initial and final states of each section are at the same pressure the initial state of the air compression and entry into the cavern process matches the final state of the air outlet and turbining process, and it is a state of very low density, ie, superheated steam, saturated steam or wet steam with high steam dryness the final state of the air compression and entry into the cavern process matches the initial state of the air outlet and turbining process, and it is a state of very high density, ie, subcooled liquid, saturated liquid or wet steam with low dryness during periods of air compression and entry into the cavern/air outlet and turbining, the auxiliary fluid is forced to get out of the membrane, follow its section of the Rankine cycle, and re-enter the membrane again, in a continuous process which causes that the auxiliary fluid confined in the membrane has a total decreasing/increasing volume, thereby allowing entry of air into the cavern/displacing air out of the cavern during periods in which air is left stored in the cavern as well as during periods in which cavern is left empty of air, the auxiliary fluid is stored within the membrane in the final state corresponding to the Rankine cycle section that had previously followed As stated above, the cycle followed by the auxiliary fluid may have multiple layouts. As examples, the cold focus of the Rankine cycle can be located either at the temperature at which the auxiliary fluid is stored, so that the Rankine cycle section to follow by the auxiliary fluid during the air compression and entry into the cavern process is just passing through the condenser, or at a lower temperature, to achieve optimum energy efficiency, but at the cost of having to carry out turbining sections during periods when there is an excess of electricity in the power grid (ie, during the air compression and entry into the cavern process).

Providing that pressures at the start and the end of both sections of the Rankine cycle are the same, and that the auxiliary fluid volume occupied within the membrane is gradually reduced during the air compression and entry into the cavern process and increased during the air outlet and turbining process, cavern air filling and emptying operations are performed at constant pressure, leading to an improvement in turbines and compressors efficiencies on one side and to a drastic reduction in cavern volume requirements.

These reductions in cavern volume requirements implicate that it will be feasible to excavate caverns through hard rock mining, instead of solution mining in salt domes. This fact expands in a very important way the range of possible locations for CAES plants, and, in addition, it will also allow feasibility for much lower power rating plants (excavation by dissolving salts in salt domes is only feasible if carried out for large volumes), and secondly it will also allow that the caverns can be thermally insulated. Likewise, it will even stop being absolutely unthinkable to use pressurized tanks rather than caverns.

Thus it will be possible to store air at high temperatures and to use water or organic fluids as auxiliary fluid, since, provided the process carried out in a CAES plant, the higher the temperature at which air is stored the greater will be the overall system efficiency. In addition, this will allow use natural cold sources for the condenser as water or atmospheric air.

Thereby, the result is the combination of a Brayton cycle (followed by the air) with a Rankine cycle (followed by the auxiliary fluid). This layout also allows harnessing Brayton cycle residual heat in the exhaust gases for regasification and heat of the auxiliary fluid in order to make it follow its Rankine cycle.

We have called this whole process, which is the basis of the invention, "Combined Cycle CAES Technology" or "CCC Technology", and, as described, it is a process with a much higher efficiency in every way than CAES conventional technology. With CCC technology multiple objectives are achieved:

- optimize energy efficiency of the plant
- optimize cavern or tank volume requirements to store the air
- expand the range of possible locations for CAES plants
- enable operation at high temperatures
- work with air clean of impurities CCC technology opens the door to many possible combinations for further energy efficiency optimizations. For example, heat of the turbine exhaust gases can be harnessed as a heat source for another Rankine cycle, operated with the auxiliary fluid itself or with other organic fluids.

On the other hand, and providing latest technological advances that have been developed in terms of thermal insulation materials, it is possible to fabricate adiabatic membranes, so that, as well as being flexible and able to separate compressed air from the auxiliary fluid, they are able to maintain a temperature gap between both. This will allow to store the air even at higher temperatures than those of the auxiliary fluid, and, therefore, it will be possible to think on compressing the air in a single stage, without intermediate coolings, and storing it at the temperature it acquires after compression. This process requires more energy consumption, but this fact means no inconvenience because this energy consumption is required when there is an excess of energy in the power grid which has to be stored, ie, actually what this process will mean is that there will be a new significant reduction in tank or cavern volume requirements, because energy stored per unit volume will be higher.

The great advantage of this process is that when air enters the turbine it will not be necessary to heat it again, which results in a spectacular increase in the energy efficiency of the system.

Performing the compression and the turbining with single stages also enables to use the same machine for both functions, as in the pumped storage hydro plants.

But in addition to all advantages that have been exposed, CCC technology has other advantages that make it overcome with regard to electricity generation many other electricity generation processes in general:

- it allows to make a constant volume extra heating of the compressed air and/or the auxiliary fluid inside the tanks or caverns, because they are designed to withstand high working pressures, ie, using tanks or caverns as boilers, but with the great advantage over conventional boilers that they can withstand high working pressures and have enough volume to perform a constant volume heating inside them, thus increasing the energy efficiency in a spectacular way
- it is perfectly possible to hybridize it with renewable energy and even with nuclear energy There are other interesting CCC layouts:

- performing a reverse process, storing the compressed air within the membrane and leaving the auxiliary fluid on the outside of it, which can represent some mechanical advantages, due to the different densities of the air and the auxiliary fluid in its different states
- using an auxiliary tank or cavern for storing the auxiliary fluid when it is in liquid state, being as well confined within a membrane inside the auxiliary tank or cavern, being filled the rest of the auxiliary tank or cavern with compressed air from the main tank or cavern, so that compressed air is transferred from the auxiliary tank or cavern to the main tank or cavern when the auxiliary tank or cavern is being filled with liquid auxiliary fluid and in the opposite direction when it is being emptied, thus achieving to maintain constant pressure in the auxiliary tank or cavern as well and allowing differentiated constant volume heating of the air and the auxiliary fluid during the period in which the air is stored in the cavern, that is during the period prior to extraction and turbining
- in the above case of working with an auxiliary tank or cavern, the auxiliary fluid can be stored in two states of the Rankine cycle it is obliged to follow which are at different pressures, taking advantage of the existence of two tanks or caverns, being possible for example to match the section to follow during air compression and entry into the main tank or cavern with the condenser and pumping section of the Rankine cycle, thus consuming energy at the pump during periods in which there is an excess of electrical energy in the power grid
- using the heat released in the condenser of the Rankine cycle as a heat source for another additional Rankine cycle, which operates with the same auxiliary fluid at different pressures or with water or an organic fluid
- using the heat released in the condenser of the Rankine cycle as a heat source for another additional Rankine cycle, which operates with the same auxiliary fluid at different pressures or with water or an organic fluid, being stored in a new tank or auxiliary cavern thermally insulated in order to be extracted and turbined when there is a high electricity demand in the electric power grid
- storing the heat released in the condenser of the Rankine cycle and/or the heat released in the intermediate compressor coolings with a thermal storage system, so that this heat can be subsequently used as a heat source to preheat the air coming out of the cavern prior to turbining it, to regasificate the auxiliary fluid and/or as a heat source for another additional Rankine cycle, which operates with the same auxiliary fluid at different pressures or with water or an organic fluid when there is a high electricity demand in the electric power grid

DESCRIPTION OF THE DRAWINGS

To complement the description that is being made and in order to help having a better understanding of the invention features, two figures are provided which, on an illustrative and non-limiting basis, represent the following.

DETAILED DESCRIPTION OF THE INVENTION

Two preferred embodiments of the invention are exposed below, as both layouts may have a significant market projection:

Mode 1: Temperature Balance Operation

Figure 1:
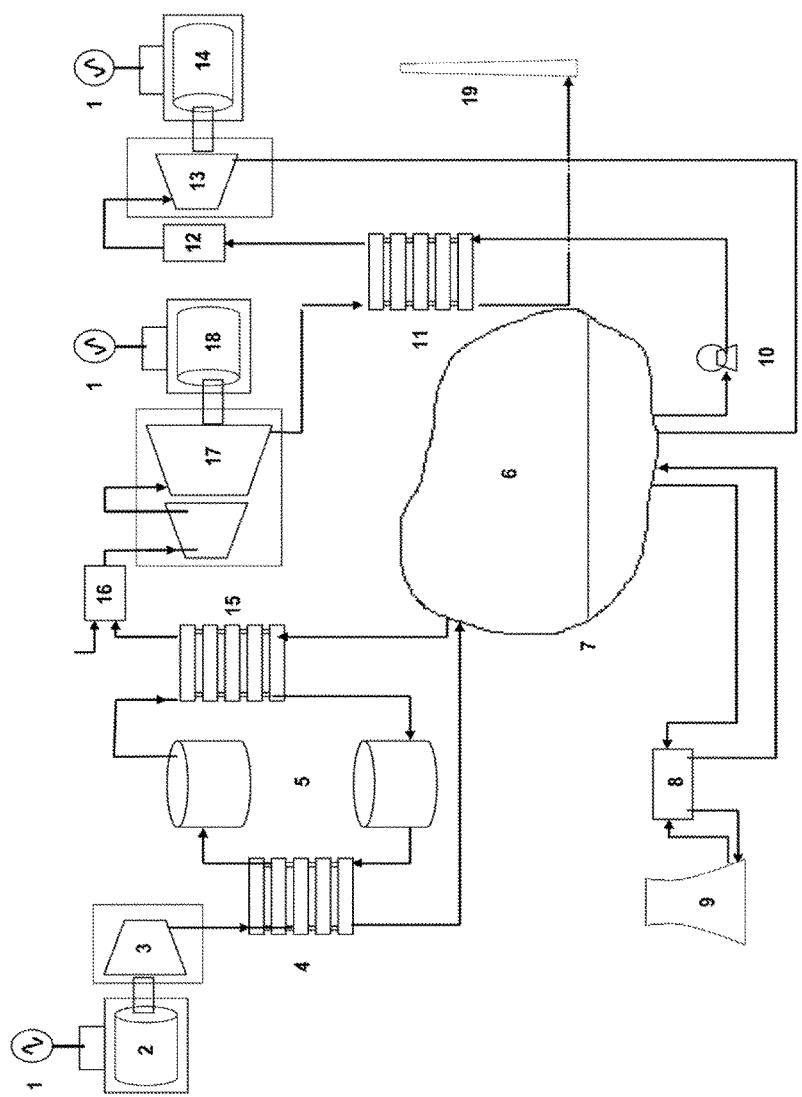
FIG. 1.—It shows a process diagram of one of the possible layouts of a CCC technology plant, which stores the compressed air at the same pressure and temperature conditions than the auxiliary fluid (water) is stored, and which has a thermal storage system for the heat generated during the compression of the atmospheric air FIG. 2.—It shows a process diagram of one of the possible layouts of a CCC technology plant with adiabatic membranes, which stores the air at a higher temperature than the temperature of the auxiliary fluid (water)

FIG. 1 shows, on an illustrative and non limiting basis, a preferred embodiment of the invention, which is to store energy from the electric power grid (1) with a CCC plant technology, in which, during periods in which there is excess power in the power grid, the electric motor (2) drives the compressor (3), which captures atmospheric air and compresses it adiabatically in a single stage up to a pressure around 40 bar and the resulting temperature, around 550° C.

This compressed air is circulated through a heat exchanger (4), were it transfers heat to a heat storage system (5), for example a molten salt heat storage system with two tanks at different temperatures, dropping its temperature down to 250° C. and having a pressure equal to the corresponding vapor pressure of water at that temperature (about 39.75 bar).

Air compression could also have been carried out in several stages, with intermediate coolings and transferring heat to the heat storage system (5).

Subsequently compressed air is circulated into an artificial cavern (6), which has been excavated by hard rock mining, and whose interior walls are thermally insulated. The artificial cavern (6) was initially full of water in saturated steam state under the same conditions of pressure and temperature than the incoming compressed air (250° C. and around 39.75 bar).

In the air inlet into the artificial cavern (6) there is an impermeable membrane (7), flexible and able to withstand working temperatures of 250° C., such as flexible teflon. This membrane is initially completely folded, leaving all the artificial cavern space for the water in saturated steam state as explained.

As air enters into the membrane (7), it displaces saturated steam water, which goes out of the artificial cavern (6) and is circulated to the condenser (8), where it is liquefied at constant pressure and temperature, to become saturated liquid at the same pressure and temperature conditions. The condenser (8) can be refrigerated by a cooling tower (9) as shown in FIG. 1, or, providing the high temperature at which it works, the heat released in it can be stored in the heat storage system (5) or used as a heat source for an auxiliary Rankine cycle operating with water at low temperatures or with an organic fluid.

Saturated liquid water is redirected back to the artificial cavern (6), sharing space with the remaining saturated steam water, but occupying much less space than when in saturated steam state, and thus allowing the membrane (7) to be gradually filled with the incoming 250° C. and about 39.75 bar compressed air.

Process continues until the membrane (7) is completely full of air and saturated steam water has fully been transformed into saturated liquid water, or until there is a demand on the power grid that makes preferable to stop storing energy. At this point the shut-off valves of the artificial cavern (6) are shut, and air and water are left stored in the cavern, with the CCC plant completely stopped, with no electrical energy consumption or generation.

The plant remains inactive until electricity demand in the electric power grid is such that it is required to generate electricity. Then it begins to extract saturated liquid water from the cavern, being driven by the pump (10) into a heat exchanger (11) and subsequently into a boiler (12) where water is regasified and further heated until it turns into steam state at high pressure and temperature conditions, to make it then pass through a steam turbine (13) which drives an alternator (14) that generates electrical energy and returns it into the electric power grid (1).

At the outlet of the steam turbine water is again in saturated steam state around 39.75 bar and 250° C., being redirected back into the cavern.

Saturated steam water occupies much more volume than before when it comes back into the cavern, and displaces the air enclosed within the membrane (7), which comes out of the artificial cavern (6) and is heated in a heat exchanger (15), which takes heat from the heat storage system (5), and subsequently in a boiler (16), to be finally turbined in the turbine (17), which could be the same machine that the compressor (3) but operating in reverse sense, which drives the alternator (18), producing electricity and injecting it into the electric power grid (1).

Exhaust gases from the turbine (17), which have an important thermal energy, are used to regasify and further heat the auxiliary fluid through the heat exchanger (11) and subsequently they are sent either to the exit chimney (19), or to be stored in the thermal storage system (5) or to be used as a heat source for an auxiliary Rankine cycle operating with water at low temperatures or with an organic fluid.

This process continues until electricity demand in the power grid drops enough to justify stopping the plant or until the artificial cavern (6) is completely empty of air and is completely filled with saturated steam water.

From this point, shut-off valves are shut again and plant remains inactive until there is again an excess of electricity in the power grid such that it is required to be stored, beginning again to perform the complete cycle described, and being repeated the whole process indefinitely.

It has been assumed, as an example, working with a flexible teflon sheet at 250° C. and at pressure of about 39.75 bar, which is the vapor pressure of water at that temperature. But is perfectly possible using other materials such as flexible steel foils, which are able to operate at much higher temperatures, being also flexible and impermeable to air and water steam. Thus it is perfectly possible to reproduce other preferred embodiments of the invention using similar processes but operating at higher temperatures and at the water vapor pressure corresponding to those temperatures.

As it has been explained in the section "Description of the Invention", the higher the working pressure and temperature the higher the overall efficiencies that will be obtained, and maximum pressure and temperature working conditions will be determined by the structural strength of the tanks or caverns, and by the availability of thermal insulation and other materials.

Mode 2: Adiabatic Membrane or Operation

FIG. 1 shows, on an illustrative and non-limiting basis, another preferred embodiment of the invention, which is to store energy from the electric power grid (1) with a CCC plant technology, in which, during periods in which there is excess power in the power grid, the electric motor (2) drives the compressor (3), which captures atmospheric air and compresses it adiabatically in a single stage up to a pressure around 60 bar and the resulting temperature, around 650° C.

Compressed air is circulated into an artificial cavern (6), which has been excavated by hard rock mining, and whose interior walls are thermally insulated. The artificial cavern (6) was initially full of water in saturated steam state at 60 bar and the corresponding temperature at which 60 bar is the water vapor pressure, that is around 275° C.

In the air inlet into the artificial cavern (6) there is an impermeable membrane (7), flexible, thermally insulating and able to withstand working temperatures of at least 650° C. on the air side and 275° C. on the water steam side, fabricated for example as a sandwich with a ceramic mat on the inside and flexible steel sheets on the outside. This membrane (7) is initially completely folded, leaving all the artificial cavern space for the water in saturated steam state as explained.

Figure 2:
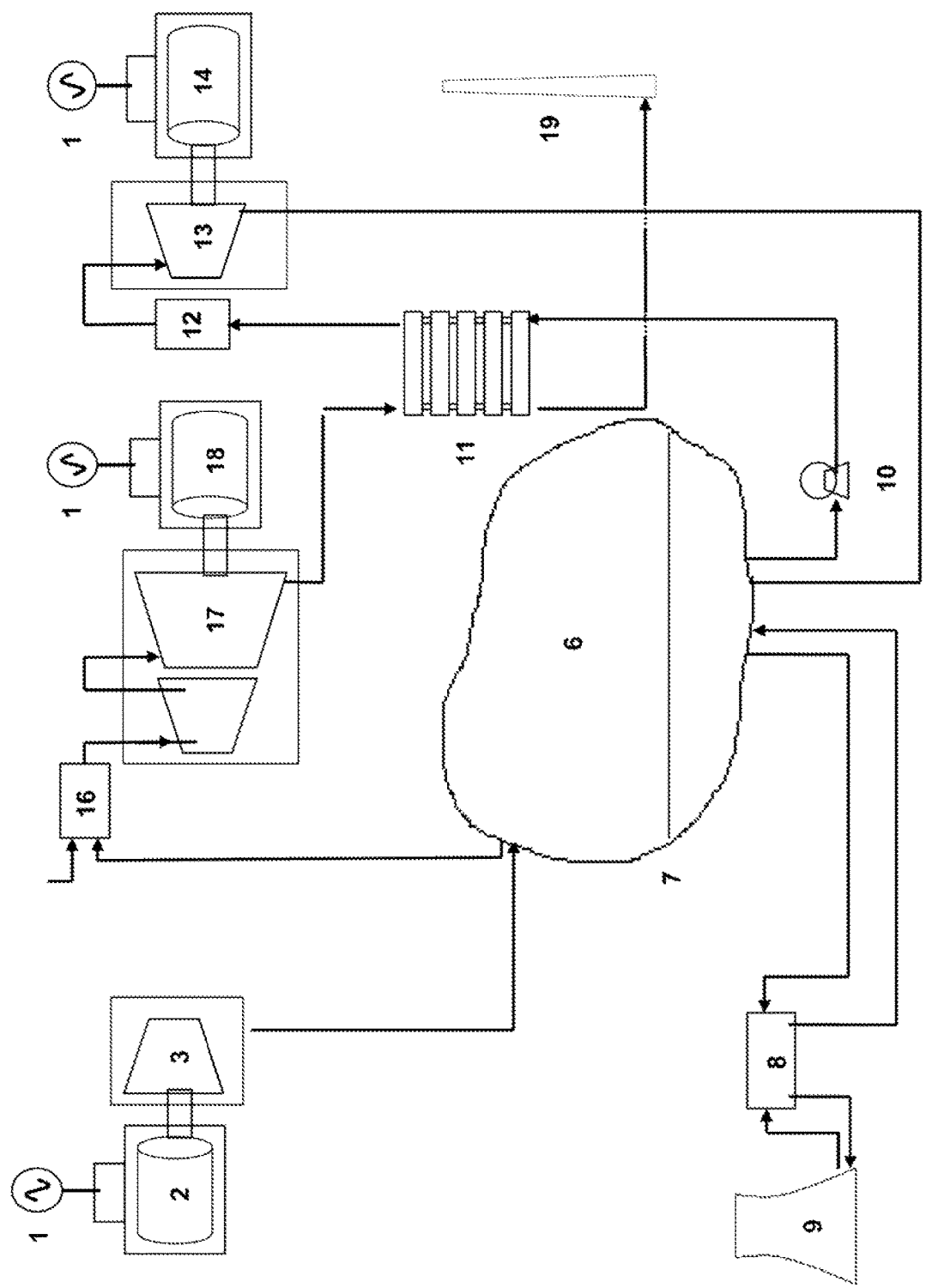

As air enters into the membrane (7), it displaces saturated steam water, which goes out of the artificial cavern (6) and is circulated to the condenser (8), where it is liquefied at constant pressure and temperature, to become saturated liquid at 60 bar and 275° C. The condenser (8) can be refrigerated by a cooling tower (9) as shown in FIG. 2, or, providing the high temperature at which it works, the heat released in it can be stored in a heat storage system or used as a heat source for an auxiliary Rankine cycle operating with water at low temperatures or with an organic fluid.

Saturated liquid water is redirected back to the artificial cavern (6), sharing space with the remaining saturated steam water, but occupying much less space than when in saturated steam state, and thus allowing the membrane (7) to be gradually filled with the incoming 60 bar and 650° C. compressed air.

Process continues until the membrane (7) is completely full of air and saturated steam water has fully been transformed into saturated liquid water, or until there is a demand on the power grid that makes preferable to stop storing energy. At this point the shut-off valves of the artificial cavern (6) are shut, and air and water are left stored in the cavern, with the CCC plant completely stopped, with no electrical energy consumption or generation.

The plant remains inactive until electricity demand in the electric power grid is such that it is required to generate electricity. Then it begins to extract saturated liquid water from the cavern, being driven by the pump (10) into a heat exchanger (11) and subsequently into a boiler (12) where water is regasified and further heated until it turns into steam state at high pressure and temperature conditions, to make it then pass through a steam turbine (13) which drives an alternator (14) that generates electrical energy and returns it into the electric power grid (1).

At the outlet of the steam turbine water is again in saturated steam state around 60 bar and 275° C., being redirected back into the cavern.

Saturated steam water occupies much more volume than before when it comes back into the cavern, and displaces the air enclosed within the membrane (7), which comes out of the artificial, cavern (6) and is heated in a boiler (16), to be finally turbined in the turbine (17), which could be the same machine that the compressor (3) but operating in reverse sense, which drives the alternator (18), producing electricity and injecting it into the electric power grid (1).

Exhaust gases from the turbine (17), which have an important thermal energy, are used to regasify and further heat the auxiliary fluid through the heat exchanger (11) and subsequently they are sent either to the exit chimney (19), or to be stored in the thermal storage system or to be used as a heat source for an auxiliary Rankine cycle operating with water at low temperatures or with an organic fluid.

This process continues until electricity demand in the power grid drops enough to justify stopping the plant or until the artificial cavern (6) is completely empty of air and is completely filled with saturated steam water.

From this point, shut-off valves are shut again and plant remains inactive until there is again an excess of electricity in the power grid such that it is required to be stored, beginning again to perform the complete cycle described, and being repeated the whole process indefinitely.

Indicated values of pressure and temperature in both preferred embodiment modes of the invention that have been exposed are approximate and only for guidance, as they have been roughly calculated assuming ideal processes and with no regard to losses.

Working values in real plants depend on the actual processes and operating conditions that are acceptable in terms of the strength of the tanks or caverns and thermal insulation materials available.

In both preferred embodiments it has been assumed working with saturated liquid and steam water, although systems can be designed to work in areas of wet steam, superheated steam or subcooled liquid.

The invention claimed is:

1. A combined cycle compressed air energy storage process, comprising:
   providing a vessel having an inlet passage;
   providing a membrane container within the vessel, wherein the membrane container is flexible and fluid-impermeable and wherein an interior volume of the membrane container is disposed in fluid communication with an exterior of the vessel through the inlet passage of the vessel;
   providing an auxiliary fluid within the vessel and outside of the membrane container;
   circulating compressed air into an inside of the membrane container through the inlet passage of the vessel, thereby expanding a volume of the membrane container and displacing a corresponding volume of the auxiliary fluid to a volume reducing system that is disposed in fluid communication with an interior of the vessel;
   reducing a displaced volume of the auxiliary fluid, thereby providing a volume-reduced auxiliary fluid;
   redirecting at least a portion of the volume-reduced auxiliary fluid back into the interior of the vessel to mix with any remaining auxiliary fluid, thereby providing a mixed auxiliary fluid; and
   continuing to circulate, volume reduce, and redirect until a desired amount of compressed air is present within the membrane container, balanced by the mixed auxiliary fluid.

2. The combined cycle compressed air energy storage process of claim 1, further comprising:
   extracting the mixed auxiliary fluid to a turbine that is disposed in fluid communication with the interior of the vessel, thereby providing an extracted mixed auxiliary fluid;
   turbining the extracted mixed auxiliary fluid;
   circulating the auxiliary fluid to a condenser;
   condensing the auxiliary fluid, thereby providing a liquid auxiliary fluid;
   circulating the liquid auxiliary fluid to a pump;
   pumping the liquid auxiliary fluid; and
   redirecting at least a portion of the volume-reduced auxiliary fluid back into the interior of the vessel to mix with any remaining auxiliary fluid.

3. The combined cycle compressed air energy storage process of claim 2, wherein turbining the extracted mixed auxiliary fluid includes using the vessel as a boiler.

4. The combined cycle compressed air energy storage process of claim 1, further comprising:
extracting the auxiliary fluid to a turbine that is disposed in fluid communication with the interior of the vessel;
circulating the auxiliary fluid to a condenser;
condensing the auxiliary fluid; and
redirecting at least a portion of the volume-reduced auxiliary fluid back into the interior of the vessel to mix with any remaining auxiliary fluid.

5. The combined cycle compressed air energy storage process of claim 4, wherein condensing the displaced volume of the auxiliary fluid results in released heat, the process further comprising:
storing at least a portion of thermal energy present in the released heat in a thermal storage system, thereby providing a stored thermal energy; and
using the stored thermal energy at least in part to heat a second auxiliary fluid.

6. The combined cycle compressed air energy storage process of claim 1, further comprising providing thermal insulation on an inside surface of the vessel.

7. The combined cycle compressed air energy storage process of claim 1, wherein the membrane container includes an adiabatic membrane.

8. The combined cycle compressed air energy storage process of claim 7, wherein the membrane container includes an insulating material mat disposed between sheets of adiabatic membranes.

9. The combined cycle compressed air energy storage process of claim 8, wherein circulating the compressed air into the inside of the membrane container is performed in a single stage, without intermediate coolings, such that the compressed air is stored in the membrane container at a compression temperature.

10. The combined cycle compressed air energy storage process of claim 7, wherein circulating the compressed air into the inside of the membrane container is performed in a single stage, without intermediate coolings, such that the compressed air is stored in the membrane container immediately after compression.

11. The combined cycle compressed air energy storage process of claim 1, wherein circulating compressed air into the inside of the membrane container is performed using an air compressor, wherein the air compressor can be configured as a turbine with a reversed rotor rotation direction.

12. The combined cycle compressed air energy storage process of claim 1, further comprising storing the auxiliary fluid in an auxiliary vessel.

13. The combined cycle compressed air energy storage process of claim 1, wherein circulating compressed air into the inside of the membrane container results in an acquisition of heat by the compressed gas, the combined cycle compressed air energy storage process further comprising:
storing at least a portion of thermal energy present in the heat acquired by the compressed gas in a thermal storage system, thereby providing a stored thermal energy; and
using the stored thermal energy at least in part to subsequently preheat the compressed air prior to releasing the compressed air from the vessel.

14. A combined cycle compressed air energy storage process, comprising:
providing a vessel having an inlet passage;
providing a membrane container within the vessel, wherein the membrane container is flexible and fluid-impermeable;
providing an auxiliary fluid within the membrane container;
circulating compressed air into an inside of the vessel through the inlet passage of the vessel, thereby compressing a volume of the membrane container and displacing a corresponding volume of the auxiliary fluid to a condenser that is disposed in fluid communication with an interior of the membrane container, thereby providing a displaced volume of the auxiliary fluid;
reducing the displaced volume of the auxiliary fluid, thereby providing a volume-reduced auxiliary fluid;
redirecting at least a portion of the volume-reduced auxiliary fluid back into the interior of the vessel to mix with any remaining auxiliary fluid, thereby providing a mixed auxiliary fluid; and
continuing to circulate, condense, and redirect until a desired amount of compressed air is present within the vessel, balanced by the mixed auxiliary fluid.

* * * * *